April 12, 1938.  M. A. BECKMANN  2,114,041
RELIEVED STABILIZED PISTON
Filed May 12, 1936  2 Sheets-Sheet 1

INVENTOR.
MELBOURNE A. BECKMANN
BY Chester Tietig
ATTORNEY.

INVENTOR.
MELBOURNE A. BECKMANN
BY Chester Tietig
ATTORNEY.

Patented Apr. 12, 1938

2,114,041

UNITED STATES PATENT OFFICE 2,114,041

RELIEVED STABILIZED PISTON

Melbourne A. Beckmann, Cincinnati, Ohio, assignor to Aluminum Industries, Incorporated, Cincinnati, Ohio, a corporation of Ohio Application May 12, 1936, Serial No. 79,311

6 Claims. (Cl. 309—11)

This invention relates to a relieved, stabilized piston intended especially for automobile internal combustion engines. It is especially adapted for manufacture from aluminum piston alloys by the permanent mold process altho any other suitable material or method of manufacture may be used.

One object of this invention is to provide a piston which is stabilized against rocking action, that is, one that is maintained in a vertical position during operation.

Another object is to provide a piston, the skirt of which is reinforced or gusseted against collapse without the use of a construction so rigid that the skirt cannot adapt itself to the cylinder.

A third object is to provide a piston having a skirt of adaptable and even pressure on the cylinder wall, coupled with a large bearing area thereon which area is free from spots of localized pressure.

In the drawings, Figure 1 is an elevation, partly in section, showing the reinforcing means and one of the relieved areas.

My piston comprises a head 10 and a skirt 11; the usual pin bosses 12 having openings 13, being contained within the skirt. Grooves 14 within openings 13 are for the reception of locking rings.

The piston is cam ground, that is, the diameter along the axis of the pin bosses is from three to ten thousandths shorter in the ordinary sizes of automobile pistons, than the diameter 90° therefrom. Such shape, as is well known, partially compensates for the greater expansion that occurs in operation along the pin axis.

Figure 1:
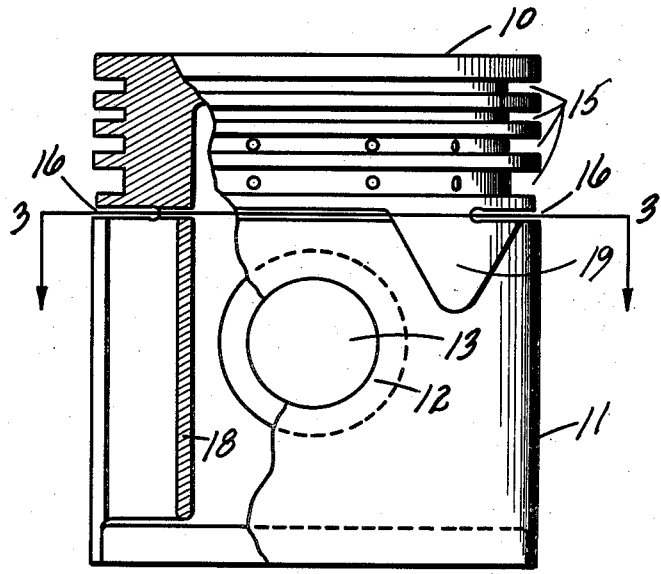
Figure 2:
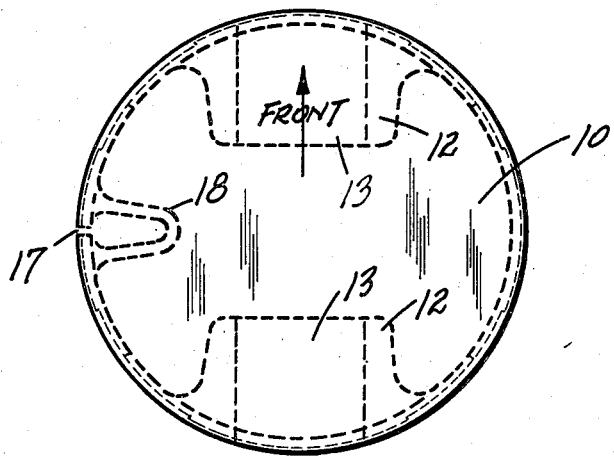
Figure 2 is a plan view of the piston showing the interior details in dotted line.
Figure 3:
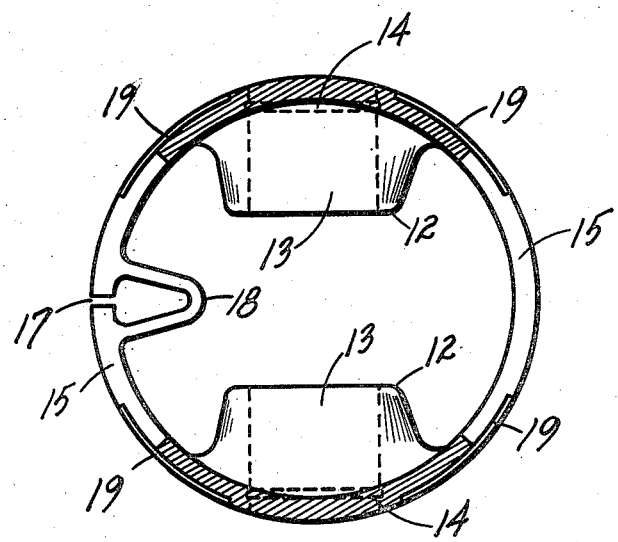
Figure 3 is a transverse sectional view taken along the line 3—3 of Figure 1.
Figure 4:
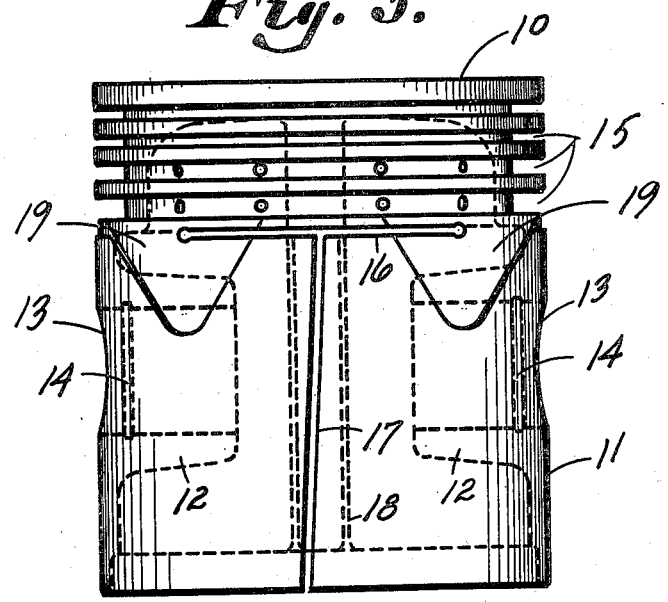
Figure 4 is an elevation from a position 90° removed from that of Figure 1. The position of the relieved areas in relation to the T-slot is shown.

The head is provided with ring grooves 15. On each side of the piston, i. e. the left and right sides as shown in Figure 1, there is a horizontal slot 17, about $\frac{1}{16}$ inch wide and occupying about 90° of the circumference. These slots lie between the head and the skirt and their purpose is to hinder heat flow from the head to the working faces of the skirt.

Since the right side of the piston in an automobile, as seen from the driver's seat, is the side of major working pressure, this side is left vertically unslotted. A substantially vertical slot 17 slanted just enough to avoid ridging of the cylinder, is however, provided on the left side. This slot joins horizontal slot 16 on that side to make a T.

Behind the slot 17 there is a "hairpin" bridge 18 cast integrally with the piston. This is vertical and connects the ends of the skirt across the slot. Its function is to act as a gusset to reinforce the skirt at this line against collapse and to lessen the "accordion" action of the skirt which tends to open and close slot 16 as the piston operates. This bridge is not a spring, hence does not press the skirt against the cylinder wall when the engine is cold. This is an advantage over spring devices since little or no pressure at cold temperatures insures easy cranking of the engine. Further, springs are usually made of steel, which has poor heat conductivity, hence heat distribution in the skirt is interrupted. Steel springs also tend to lose their resilience after enduring piston working temperatures, whereas my bridge cannot.

The bridge may have a usual height of about $\frac{1}{2}$" and a bottom width of about $\frac{3}{8}$". I do not limit myself to such dimensions. The angle of dehiscence may range from 10 to 50°. I prefer a 15 degree angle. The length of the bridge should be the distance from the inner surface of the head 10 to a point about $\frac{1}{4}$" above the bottom of the skirt. That part of the bridge which is above the slot 16 is preferably solid.

While cam grinding can be depended upon to eliminate the binding of an entire side of a piston after heating in operation, it is impossible to eliminate localized spots of high pressure with cam grinding alone and still maintain a good fit, hot or cold.

By careful checking of the areas of highest pressure on pistons in service, I have determined that about four such areas exist in a cam ground piston at the top of the skirt just where the shorter diameter merges into the longer one. By relieving such areas, I have substantially eliminated areas of high pressure which contribute nothing toward the working efficiency of the piston and by doing so, I have eliminated a great deal of unnecessary drag.

In my piston each numeral 19 indicates a V-shaped relieved area which is depressed about $\frac{1}{32}$". These areas are preferably cast into the piston. They are four in number and are equidistant from each other. Their location is at the top of the skirt and midway between the bridge and the pin openings and the one side, and between the middle of the working face of major pressure and the pin boss openings on the other side. So each pair of these areas are opposite each other and the middle line of each V is substantially 45° from the vertical middle line of each pin opening.

The extent of the V may be varied according to the kind of duty the piston is to perform. In heavy, slow speed engines it will be smaller and in light high speed ones it will be larger. The invention does not reside in the selection of V's of any given area but it does reside partially in the provision of V's which are large enough to and are positioned to eliminate substantially the localized high pressure areas. As an example however, on a piston of 3⅝" diameter by 4.0" length the area of each of the V's is about 0.75 sq. inch each. The tops of the V's extend between 25° and 65°, 115° and 155°, 205° and 245°, 295° and 335°, when referred to a geometrical basis. The length of the V may be from ⅛ to ⅓ the length of the piston skirt, making the angle between 30 and 50°.

There is a high degree of co-action between the bridge 18 and the V-shaped reliefs. The bridge keeps the V's, in relation to the cylinder wall, at the points which would be points of high localized pressure if the V's were absent. The piston skirt is allowed just enough movement by the bridge in a circumferential direction, to prevent buckling due to heat expansion. However such excessive expansion as would cause the edges of slot 17 to buckle inward after meeting, is rendered impossible.

While I do not limit myself to any particular metal, I prefer to make pistons according to my invention of the following alloy:—

|  | Percent |
|---|---|
| Copper | 0.5 to 1.5 |
| Silicon | 12.5 to 14.5 |
| Magnesium | 0.75 to 1.00 |
| Iron | 1.00 |
| Nickel | 2.00 to 3.00 |
| Zinc | 1.05 |
| Manganese | 0.05 |
| Aluminum-balance | |

This alloy has a coefficient of expansion of 0.000011 inch per inch per degree Fahrenheit up to 500° F.

In the construction described, the piston expands more along the pin axis than across it, thus tending to make the piston round when very hot. Expansion along the pin axis tends to shorten the diameter of the piston across that axis, but before the piston is hot enough to be perfectly round, the localized high pressure areas are set up midway between the two axes on the circumference of the piston. Because the V's are present however, high localized pressure cannot be exerted here. This is shown by the appearance of pistons which have been in service; they show that the V's and the bridge have produced an even contact all over the piston and that there is no edge wear which would be an indication of rocking.

In this specification and the appended claims, the term "relieved portion" means an area which is below the working and outside bearing surface of the piston.

I claim as my invention:—

1. A piston for internal combustion engines which comprises a head, a skirt attached thereto, piston pin bosses in said skirt, a T-slot in said skirt at substantially 90° from the axis of said bosses and an integral bridge acting as a gusset and joining the ends of the skirt across said slot, said bridge comprising relatively thin and relatively high walls converging at a dihedral angle in the vicinity of 15° to a rounded connecting portion, and relieved portions in the top of said skirt, the centers of which occupy positions substantially 45° from the centers of said piston pin bosses.

2. A piston according to claim 1 in which the relieved portions are V-shaped with the apexes of the V extending toward the skirt end of the piston.

3. A piston according to claim 1 in which the relieved portions are about $\frac{1}{32}$ of an inch deep.

4. A piston according to claim 1 in which the diameter of the piston is sufficiently smaller along the axis of the bosses than on the axis of 90° therefrom, to allow the piston to assume a substantially circular shape when it is hot from operation.

5. A piston for internal combustion engines which comprises a head, a skirt attached thereto, piston pin bosses in said skirt, a T-slot in said skirt at substantially 90° from the axis of said bosses and an integral bridge acting as a gusset and joining the ends of the skirt across said slot, said bridge comprising relatively thin and relatively high walls converging at a dihedral angle in the vicinity of 15° to a rounded connecting portion.

6. A piston according to claim 5 in which the diameter of the piston is sufficiently smaller along the axis of the bosses than on the axis of 90° therefrom, to allow the piston to assume a substantially circular shape when it is hot from operation.

MELBOURNE A. BECKMANN.